July 19, 1960 H. E. KALLMANN 2,945,307

TALKING BOOK HAVING MAGNETIC RECORDING MEANS AND SHIELDING MEANS THEREFOR

Filed Oct. 31, 1955

INVENTOR:
Heinz E. Kallmann
BY:
Michael S. Striker
agt.

United States Patent Office 2,945,307 Patented July 19, 1960

2,945,307

TALKING BOOK HAVING MAGNETIC RECORDING MEANS AND SHIELDING MEANS THEREFOR

Heinz E. Kallmann, 417 Riverside Drive, New York 25, N.Y.

Filed Oct. 31, 1955, Ser. No. 543,698

5 Claims. (Cl. 35—35)

The present invention relates to talking books of the type wherein a recording is used to produce a sound in conjunction with indicia in the book.

Talking books resemble other books in that they comprise flat printed pages which are bound together. However talking books incorporate, in addition to printed text and illustrations, short sound tracks each of which may be audibly reproduced by a sound reproducing device placed upon it. Talking books of this type may be used as dictionaries with sound tracks which teach pronunciation placed near the text that teaches the spelling and grammar. Also talking books may provide pictures with adjacent sound tracks to teach beginners to read. Furthermore the sound tracks of such talking books may serve as spoken captions for pictures and picture sequences. These sound tracks may last for one or two seconds or even a few seconds more, and they may, for example, be in the form of magnetic recordings or grooves of a phonograph recording.

A talking book of the above type is disclosed in U.S. Patent 2,369,572 issued February 13, 1945. In a copending application, Serial Number 543,662, filed on October 31, 1955, is disclosed a small portable device which, when placed upon a sound track, will reproduce the sound track audibly through a speaker or headphone.

Requirements of a talking book, and of a talking book incorporating magnetic recordings in particular, are the following: Correlation between text and pictures and corresponding sound tracks; and proper alignment of the reproducing head with the sound track to be read. Another requirement is that no two magnetic recording layers should be in immediate contact with each other since the magnetic recordings would in such an event interact and "print through." Also, during use of the talking book, adjacent layers of magnetic recordings must be sufficiently separated from each other, by spacing or by intervening magnetic shielding, to prevent the track on the next lower layer from being reproduced together with the intended one.

The talking books disclosed in this application serve to meet the above requirements as well as others discussed below.

Figure 1:
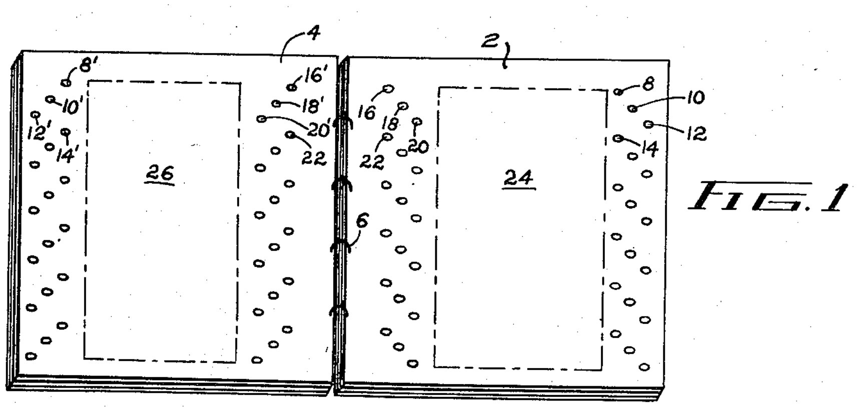
Fig. 1 shows one form of talking book according to the present invention with text and recordings on facing pages.

Referring now to the drawings, Fig. 1 shows a book according to the present invention opened to two pages which are respectively representative of the remaining pages in the book. The book which is shown in Fig. 1 is provided with a left page 4, e.g. of paper with printed text or pictures in the area 26, and the book of Fig. 1 is provided with a right page 2, e.g. of a thin sheet of plastic material forming the base for a coating suitable for magnetic recording, with tracks recorded in the area 24. In the example shown in Fig. 1 the pages of the book are held together by rings 6 to assure that the open pages are flat to provide good contact with the base of a reproducing device placed upon them. To provide alignment of the reproducing head with the sound track to be read, a column of holes is punched along each vertical edge of the pages, although if desired small depressions or dimples may be provided instead of holes. There are approximately as many holes per column as there are sound tracks on the page. Alignment is assured when locating pins on the base of the reproducing head extend into appropriate holes in the page. In order to clear the locating pins which are inserted into the holes, these holes are punched through substantially all of the pages of the book and are in alignment with each other. Inasmuch as a slight lateral displacement of the reproducing head will produce no undesirable results, the holes may be elongated and may have their longer axes respectively arranged horizontally on the pages to render insertion of the pins of the recording head into aligned holes of a plurality of pages relatively simple and easy. Although the holes may be in a straight row in a given column, the arrangement shown in Fig. 1 is preferred where the holes are arranged in groups of three in sawtooth-staggered relationship. Thus, referring to page 2 shown in Fig. 1, the distance between the holes 8 and 16 which are at the tops of the columns of page 2, respectively, is equal to the distance between the second holes 10 and 18, and is also equal to the distance between the holes 12 and 20. Then the holes 14 and 22 are respectively in vertical alignment with the holes 8 and 16, and of course the distance between the holes 14 and 22 is equal to that between the holes 8 and 16, and the remaining holes of the pages are arranged in the same manner. The distance between each pair of horizontally aligned holes corresponds to the distance between a pair of locating pins on the base of the reproducing head. The advantage of the staggered arrangement illustrated in Fig. 1 is that close spaced adjacent holes are less likely to tear, and furthermore the pins of a misaligned reproducing head will not, with the arrangement of Fig. 1, fit into two holes from adjacent lines, that is, the pins of a misaligned reproducing head will not fit into the holes 8 and 18, or 14 and 20, or even 8 and 20. The holes of page 4, shown in Fig. 1, are indicated with the same reference characters primed which are applied to the holes of page 2. These holes shown in page 4 of course appear in Fig. 1 from the ends thereof which are the reverse of the ends shown on page 2.

Figure 2:
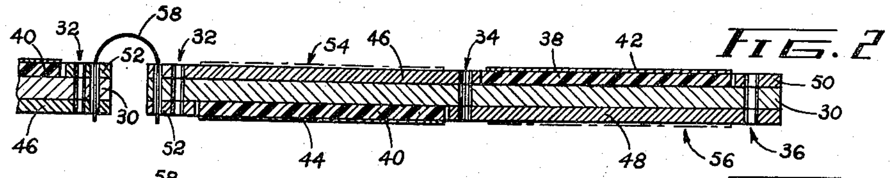
Fig. 2 is a cross sectional view of a page having adjacent text and recordings on each face thereof.

Fig. 2 shows an embodiment where the text and sound tracks are on the same face of a single page, in contrast to Fig. 1 where the text and sound tracks are respectively on separate faces of separate pages. With the arrangement of Fig. 2, although the text and tracks are on the same face of the same page, nevertheless all surfaces are flat and there is no contact between any two magnetic recording layers. Referring to Fig. 2 it will be seen that to each face of a sheet of low-grade paper 30 are attached layers of paper 46 and 48 for printed matter shown at 54 and 56. It should be noted that the paper sheets 46 and 48 do not extend completely across the paper sheet 30 which forms the core for the arrangement shown in Fig. 2. Beside the sheets 46 and 48 are located, respectively, sheets of a base for magnetic recording layers, e.g. sheets 38 and 40 with coatings 42 and 44, respectively thereon, these coatings carrying sound tracks. The sheets 38 and 40 may be made of plastic and although they may extend up to the edge of the face of the page on which they are located, it is preferred to terminate these sheets short of the edge and to place plain paper 50 and 52 at the margins, as is illustrated in Fig. 2. The pages shown in Fig. 2 are held together with a ring-type binder 58. Inasmuch as the reproducing head needs to extend over only one-half of the width of the page, with the embodiment of Fig. 2, there may be three columns of locating holes on each page, that is, a center column of holes 34, an outer column of holes 36, and an inner column of holes 32. The holes 34 and 36 are used when the reproducing head is on tracks in the layer 38, while the holes 32 and 34 are used when the head is placed on the layer 44. As is apparent from the leftmost portion of Fig. 2, the sheet 48 as well as the plastic sheet 40 face up on the left page of the opened book.

Figure 3:
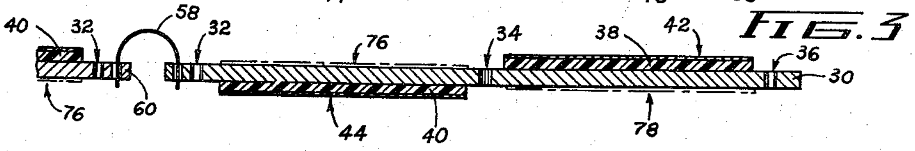
Fig. 3 is a cross sectional view of another type of page with adjacent text and recordings on each face.

Fig. 3 illustrates a variation of the embodiment of Fig. 2 and corresponding parts are indicated with the same reference characters. The embodiment of Fig. 3 differs from that of Fig. 2 in that the text is printed directly on the core page 30, as shown at 76 and 78, thereby eliminating the necessity of attaching printing paper to the sheet 30. Nevertheless, it is apparent that the pages of the embodiment of Fig. 3 will nest one within the other, except in the relatively narrow portions where the locating holes are located.

Figures 4, 5, 6:
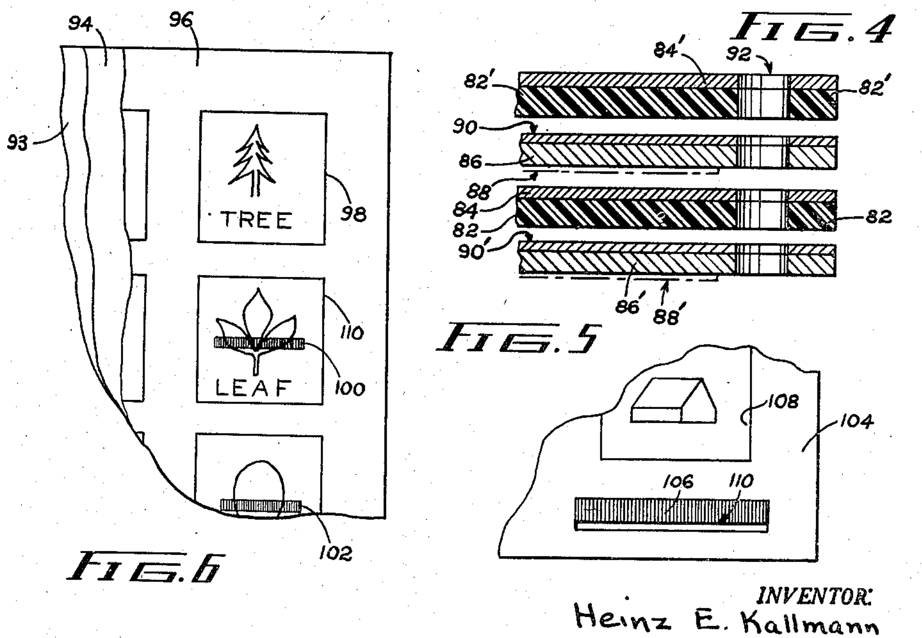
Fig. 4 is a cross section through several pages in a book where pages which carry sound recordings alternate with pages carrying printed material.
Fig. 5 shows a patch of magnetic coating on a paper page, such a patch being suitable for sound recording.
Fig. 6 shows part of a page with printed text and pictures superimposed upon sound recordings.

If, as is the case with Fig. 1, printed paper pages alternate with sheets which carry sound recording tracks, then the arrangement shown in Fig. 4 may be used. In Fig. 4 portions of a plurality of pages are shown one above the other in the position they have when the book is closed or on one side of the book when it is opened. Referring to Fig. 4 it will be seen that all of the locating holes 92 of the several pages are aligned. Fig. 4 shows two pairs of pages in cross section. In the relationship shown in Fig. 4, as when the book is closed, plastic sheets 82, 82′ carry at their top faces layers 84, 84′ of coating for magnetic recordings. Paper pages 86, 86′ have printed text or pictures on their bottom faces, as viewed in Fig. 4, as indicated at 88, 88′, so that the printed text or pictures on the bottom face of page 86 face the sound track layers 84 across the opened book when the book is opened. The paper pages also carry a layer of magnetic coating on their rear faces, as shown at 90, 90′ and this coating serves as a magnetic shield between consecutive layers of sound tracks while the one on top is being reproduced.

In many instances it is simpler, yet adequate, to coat a patch of magnetic recording layer directly on a smooth paper page or on a smooth filler on a paper base, as is shown in Fig. 5, where a patch 106 is shown on a paper page 104. With such an arrangement there is provided, as an aligning guide for the reproducing head, a groove or a rib 110, which extends parallel to the direction of the sound track. It should be noted, however, that the reproducing head may be capable of automatic fine alignment if approximately aligned with the track by aligning a pointer or a mask with the outline 108 of the text or picture aligned with the track.

Finally, coatings of magnetic recording layer material 94 (Fig. 6) may be placed directly on a paper page 93 or such a magnetic recording layer may be placed on a page provided with a smooth filler (not shown), and recording tracks 100 and 102 may then be recorded on the magnetic recording layer 94. On this magnetic recording layer are superimposed text or pictures in the form of thin opaque layers 96 of binder and pigments of even thickness yet not thick enough to weaken the sound reproductions excessively by excessive spacing between the reproducing head and the sound recording to be reproduced. In order not to cover the picture whose sound is being reproduced with the reproducer, the sound track 100 which belongs to the picture 98 is directly beneath the picture 110 while the sound track 102 which goes with the picture 110 is placed beneath another picture, etc.

I claim:

1. In an arrangement of the character described, in combination, a book having alternating imprint and recording pages; a plurality of perceptible imprint means representing information located on said imprint pages; adjacent magnetic recording medium means with a plurality of magnetic sound track means located on said recording pages, each of said sound track means corresponding to one of said imprint means; and magnetic shielding means located between any two sound track means and spaced from said magnetic recording medium.

2. A book of the character described comprising, in combination, a plurality of consecutive sheets turnably secured to each other so as to present when open two adjacent page faces; a plurality of perceptible imprint means representing information arranged at least on one of said adjacent page faces; magnetic recording medium means arranged at least on the other of said adjacent page faces and including a plurality of sound track means located adjacent to said plurality of perceptible imprint means, each of said sound track means corresponding to one of said imprint means; magnetic separating means interposed between said magnetic recording means on consecutive sheets and adapted to substantially prevent in any position of said sheets reproduction of any but the desired sound track means during reproduction, said magnetic separating means being spaced from said magnetic recording medium means in any position of said sheets; and locating means arranged adjacent to each of said magnetic sound track means in fixed spatial relation thereto and adapted to locate a pick-up head accurately upon any of said sound track means.

3. A book of the character described comprising, in combination, a plurality of consecutive sheets turnably secured to each other so as to present when open two adjacent page faces; a plurality of perceptible imprint means representing information arranged at least on one of said adjacent page faces on sheet portions of said sheets bounded on one side by one of said page faces respectively; magnetic recording medium means arranged at least on the other of said adjacent page faces and including a plurality of sound track means located adjacent to said plurality of perceptible imprint means, each of said sound track means corresponding to one of said imprint means; magnetic separating means formed by portions of said sheets located between magnetic recording means of consecutuive sheets for preventing reproduction of any but the wanted sound track means during reproduction, said magnetic separating means being spaced from said magnetic recording medium means in any position of said sheets; and locating means arranged adjacent to each of said magnetic sound track means in fixed spatial relation thereto and adapted to locate a pick-up head accurately upon any of said sound track means.

4. A book of the character described comprising, in combination, a plurality of consecutive sheets turnably secured to each other so as to present when open two adjacent page faces; a plurality of perceptible imprint means representing information arranged at least on one of said adjacent page faces; magnetic recording medium means arranged at least on the other of said adjacent page faces and including a plurality of sound track means located adjacent to said plurality of perceptible imprint means, each of said sound track means corresponding to one of said imprint means, said sheets being thick enough to act as magnetic separating means between magnetic recording means on consecutive sheets so that said recording means are sufficiently separated from each other to prevent reproduction of any but the wanted sound track means during reproduction; and locating means arranged adjacent to each of said magnetic sound track means in fixed spatial relation thereto and adapted to locate a pick-up head accurately upon any of said sound track means.

5. A book as defined in claim 2 in which each of the plurality of consecutive sheets has opposite faces, in which the plurality of perceptible imprint means are located on portions of said opposite faces, and in which at least one portion of said magnetic recording medium means is located adjacent to each of said imprint means on adjacent portions of said opposite faces of each sheet, with the imprint means located on one of said opposite faces superimposed to the magnetic recording means on the other of said faces, the recording medium means on opposite faces offset with respect to each other, and the recording medium means on contacting faces of consecutive sheet also offset with respect to each other so that all of said recording medium means are sufficiently separated from each other to substantially prevent reproduction of any but the wanted sound track means during reproduction.

References Cited in the file of this patent

UNITED STATES PATENTS

| | | |
|---|---|---|
| 1,502,312 | Mayhew | July 22, 1924 |
| 1,653,467 | O'Neill | Dec. 20, 1927 |
| 1,679,708 | Bullis | Aug. 7, 1928 |
| 2,369,572 | Kallmann | Feb. 13, 1945 |
| 2,516,579 | Leonardson | July 25, 1950 |
| 2,546,680 | Samuels | Mar. 27, 1951 |
| 2,548,011 | Frost | Apr. 10, 1951 |
| 2,550,803 | Goddard | May 1, 1951 |
| 2,603,006 | MacChesney et al. | July 15, 1952 |
| 2,677,200 | MacChesney et al. | May 4, 1954 |
| 2,743,317 | Roberts | Apr. 24, 1956 |